Nov. 7, 1961 J. N. VLACHOS 3,007,779
MODIFIED VAPOR INLET DISTRIBUTOR
Filed Sept. 22, 1958 2 Sheets-Sheet 1

INVENTOR
James N. Vlachos
BY Francis F. Johnston
AGENT

Nov. 7, 1961 J. N. VLACHOS 3,007,779
MODIFIED VAPOR INLET DISTRIBUTOR
Filed Sept. 22, 1958 2 Sheets-Sheet 2
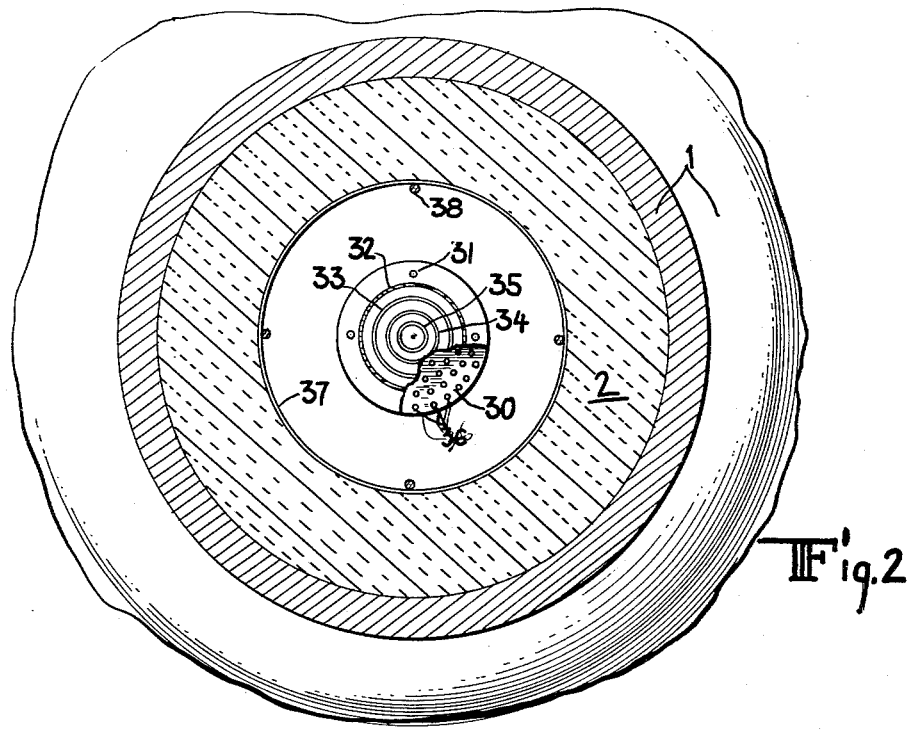
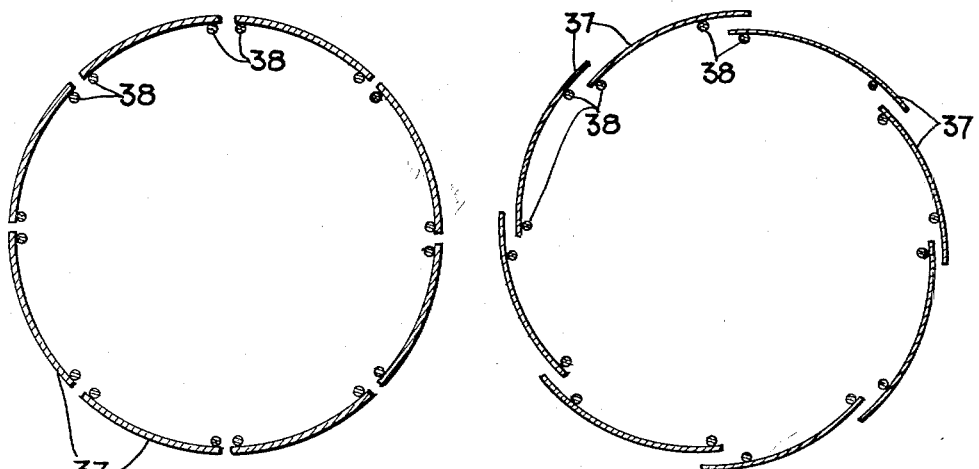
INVENTOR
James N. Vlachos
BY
Francis Johnston
AGENT

United States Patent Office 3,007,779
Patented Nov. 7, 1961

3,007,779
MODIFIED VAPOR INLET DISTRIBUTOR
James N. Vlachos, Yonkers, N.Y., assignor to Socony
Mobil Oil Company, Inc., a corporation of New York
Filed Sept. 22, 1958, Ser. No. 762,563
9 Claims. (Cl. 23—288)

The present invention relates to vapor inlet distributors for reactors employing a static bed of catalytic material and, more particularly, to vapor inlet distributors for spherical reactors employing a static bed of catalytic material.

As discussed more fully in co-pending application for United States Letters Patent Serial No. 588,135, filed May 29, 1956, in the name of Eric V. Bergstrom, the vapors entering a reactor operating at about 500 p.s.i.g. travel at almost a mile per minute, i.e., at 80 feet per second. When vapors traveling at such velocities impinge upon a bed of catalyst at angles approaching 90 degrees, the high velocity vapors can scour a crater in the catalyst bed to a depth of about one-third the total depth of the catalyst bed. To eliminate the scouring action of the high velocity vapors, a vapor distributor described in more detail in the aforesaid U.S. application Serial No. 588,135, now U.S. Patent No. 2,884,372, was designed. The vapor distributor described in the aforesaid U.S. application is constructed and arranged to introduce the high velocity vapors into the reactor as a plurality of streams flowing above and substantially parallel to the upper surface of a bed of catalytic material. In all but one spherical reactor in which the vapor distributor described in the aforesaid co-pending application has been installed, the surface of the catalyst bed has been substantially undisturbed. However, in one spherical reactor equipped with the aforedescribed distributor the catalyst was not cratered but the particles of catalyst were driven from the periphery of the bed toward the center thereof to form a mound. A redistribution of the particles of catalyst such as experienced in that single instance cannot be tolerated because the mal-distribution of the catalyst particles results in under- and over-contact time between the vaporous reactants and the catalyst. The present invention prevents substantially the movement of particles of catalyst from the periphery of the catalyst bed toward the center thereof when the high velocity vapors are introduced into the space above the bed of catalytic material as a plurality of streams flowing above and substantially parallel to the upper surface of the bed of catalyst. Accordingly, it is an object of the present invention to change the direction of flow of about 40 to about 60 percent, preferably about 50 to about 55 percent, of the vapors flowing above and substantially parallel to a static bed of catalyst. It is another object of the present invention to provide means to change the direction of flow of about 40 to about 60 percent, preferably about 50 to about 55 percent, of the vapors flowing above and substantially parallel to a static bed of catalyst in a spherical reactor. It is a further object of the present invention to provide a baffle mounted substantially perpendicular to the direction of flow of vapors issuing from a vapor distributor and flowing substantially parallel to and above the upper surface of a static bed of catalyst, said baffle being positioned in the path of about 40 to about 60, preferably about 50 to about 55, percent of the vapors issuing from said distributor. These and other objects of the present invention will become apparent to those skilled in the art from the following description thereof taken in conjunction with drawings in which FIGURE 1 is a vertical section of a spherical reactor wherein is shown means for introducing vapors into a spherical reactor as a plurality of streams flowing above and substantially parallel to the upper surface of a static bed of particle-form catalytic material and means for changing the direction of flow of about 40 to about 60 percent of the vapors issuing from the aforesaid vapor distributor.

FIGURE 2 is a plane view taken at line 2—2 of FIGURE 1,

FIGURE 3 is a plane view of a modified circular band baffle, and

FIGURE 4 is a plane view of another modification of a circular band baffle.

Figure 1:
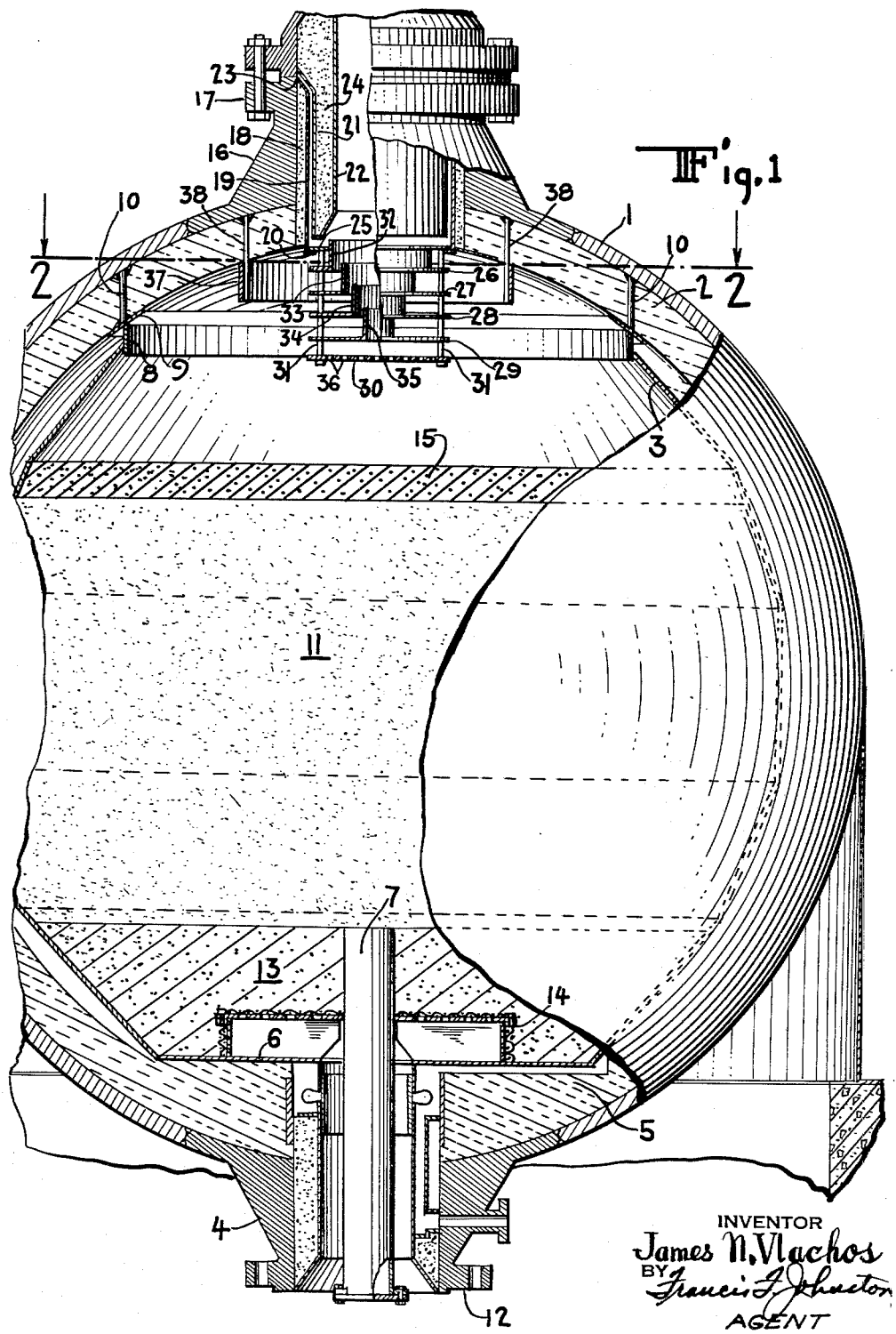

In FIGURES 1 and 2 the same indicia are used to designate the same parts. A spherical reactor is shown in FIGURE 1 having a reactor shell 1, a layer of insulating material 2, and a liner 3. The layer of insulating material is thickened in the region of the reactor vapor outlet neck 4 to provide a substantially horizontal shelf or platform 5. An annular base plate 6 is rigidly mounted on shelf 5 in any suitable manner. Annular base plate 6 has an outer diameter about that of the shelf 5 and an inner diameter about that of the outside diameter of catalyst dump pipe 7. Liner 3 is rigidly mounted in a catalyst-tight manner near the periphery of annular base plate 6. The upper end of liner 3 bears upon angle ring 8 which is rigidly mounted in any suitable manner, as by welding, to suitable support such as frusto-conical plate 9 rigidly mounted, as by welding, on a plurality of studs 10. Studs 10 are rigidly mounted in any suitable manner, as by welding, on the inner surface of shell 1. The reactor is provided with a catalyst dump pipe 7 concentric with the vertical axis of the reactor extending from the bottom of the bed of particle-form catalytic material 11 at least to the plane of the outer face of flange 12 of reactor outlet neck 4. The bed of particle-form solid catalytic material is supported by a bed 13 of particle-form inert material such as tabular alumina.

A vapor-solids separator 14 concentric with the vertical axis of the reactor is rigidly mounted on annular base plate 6. [A suitable vapor-solids separator is described in detail in co-pending application for United States Letters Patent Serial No. 775,895, filed in the names of Paradiso and Vignone on November 24, 1958.] On the bed of particle-form solid catalytic material 11 is a layer of graded inert material 15 such as tabular alumina.

The reactor is provided with a vapor inlet neck 16 having flange 17. A layer 18 of insulating material is rigidly mounted on the inner surface of vapor inlet neck 16. A distributor supporting cylinder 19 is rigidly mounted on the inner surface of vapor inlet neck 16. Distributor-supporting cylinder 19 is provided with a shoulder 20 by which the vapor distributor is movably suspended.

Within and spaced apart from distributor supporting cylinder 19 is insulation supporting cylinder 21, the outside diameter of which is slightly less than the inside diameter of distributor supporting cylinder 19. Inwardly spaced apart from insulation supporting cylinder 21 is insulation facing cylinder 22. Cylinder 19 is mounted rigidly, as by welding, on the inner periphery of flange 23 of reactor inlet neck 16. Insulation facing cylinder 21 having a frusto-conical lower section and cylinder 22 are rigidly mounted, as by welding, to the inner surface of the reducing nozzle (not shown) which is held in place by bolts (not shown) on flange 23 of inlet neck 16. Rigidly mounted as by "gunning" between cylinders 21 and 22 is insulating material 24 such as insulating concrete.

The vapor distributor comprises a plurality of say 3 or more, preferably 4, concentrically mounted annular plates 25, 26, 27, 28 and 29 and disk or circular plate 30 rigidly mounted, as by welding, on a plurality of rods 31, two of which are shown in FIGURE 1 and four of which are shown in FIGURE 2. Rigidly mounted in a suitable manner, as by welding, on the inner periphery of each of the annular plates 26, 27, 28 and 29 are collars 32, 33, 34 and 35. The upper surface or edge of each of collars 32, 33, 34 and 35 is in a plane above the plane of the upper surface of the annular plate next above the annular plate upon which the collar is mounted.

Annular plates 25, 26, 27, 28 and 29, and disk 30 have outside diameters substantially equal to the inside diameter of distributor supporting cylinder 19 and are concentric with the cylinder and the vertical axis of the reactor. Annular plate 25 has an inner diameter sufficiently less than the outside diameter of collar 32 to provide a sliding fit. The height of each of collars 32, 33, 34 and 35 is somewhat greater than the distance between the upper surface of the annular plate upon which the collar is mounted and the upper surface of the next higher annular plate. For example, the distance between annular plate 25 and the lower edge of insulation facing cylinder 22 can be 3.25 inches and the height of collar 32 four inches. Collar 32 has a diameter of about 70 to about 80 percent of the inside diameter of insulation facing cylinder 22. Collar 33 has a diameter about 70 to about 80 percent of the inside diameter of collar 34. Collar 34 has a diameter about 65 to about 75 percent of the inside diameter of collar 33. Collar 35 has a diameter about 45 to about 55 percent of the inside diameter of collar 34. Thus, about 49 to about 65, say about 52 preferably, percent of the vapors issuing from vapor inlet or insulation facing cylinder 22 pass through collar 32 and the balance flows around 33 to be deflected in a horizontal path by annular plate 26. About 49 to about 65, preferably about 52, percent of the vapors issuing from collar 32 pass through collar 33, about 42 to about 56, preferably about 45, percent of the vapors issuing from collar 33 pass through collar 34. About 20 to about 30, preferably about 26, percent of the vapors flowing through collar 34 pass through collar 35.

Disk 30 can be an unperforated plate or about 20 to about 40 percent of the total area of plate 30 can be passages, i.e., orifices 36 for vapors.

In combination with a vapor distributor by means of which vapors having velocities sufficient to disturb the distribution of particle-form solid catalytic material in a static bed, are caused to flow as a plurality of streams above and substantially parallel to the upper surface of a static bed or particle-form solid catalytic material, is means, such as circular baffle 37, positioned to change the direction of flow of about 40 to about 60, preferably about 50 to about 55, percent of the vapors flowing from a vapor distributor above and substantially parallel to the upper surface of a static bed of particle-form solid catalytic material.

Circular baffle 37 has a vertical width somewhat in excess of the distance between two successive annular plates in the vapor distributor and is positioned from the outer periphery of the annular plates in the vapor distributor a distance about 4 to 6, preferably about 5, times the distance between successive plates. Preferably, the lower edge of baffle 37 is below the plane annular plate 27 and the upper edge of baffle 37 is above the plane of annular plate 26. However, baffle 37 can be of any vertical width and positioned with relation to annular plates 26, 27, 28 and 29 in any manner to change the direction of flow of about 40 to about 60, preferably about 50 to 55, percent of the vapors flowing above a static bed of catalyst and in a direction substantially parallel to the upper surface of said static bed of particle-form solid catalytic material. Furthermore, while it is preferred that baffle 37 be a continuous circular band, a plurality of segments 37 of a circular band circumferentially spaced apart as shown in FIGURE 3 or overlapping as shown in FIGURE 4 can replace the continuous circular band 37. While in FIGURES 3 and 4 baffle 37 is shown as a plurality of segments, those skilled in the art will understand that circular band baffle can be provided with a plurality of vertical slots rather than comprising a plurality of segments. Circular band 37 is rigidly mounted in any suitable manner, as by welding, on a plurality of studs 38 of which two are shown in FIGURE 1 and four are shown in FIGURE 2. Studs 38 are rigidly mounted on the inner surface of shell 1.

I claim:

1. In a reactor having a static bed of particle-form solid catalytic material and a vapor inlet distributor constructed and arranged to introduce vapors into said reactor as a plurality of streams flowing above and substantially parallel to the upper surface of said static bed of particle-form catalytic material, the improvement which comprises baffling means horizontally spaced from said vapor inlet distributor, mounted in the paths of at least 58 percent of said plurality of streams flowing above and substantially parallel to said upper surface of said static bed of particle-form solid catalytic material, and constructed and arranged to change the direction of flow of about 40 to 60 percent of the aforesaid at least 58 percent of the parallel flowing vapors.

2. In a reactor having a static bed of particle-form solid catalytic material and a vapor inlet distributor constructed and arranged to introduce vapors into said reactor as a plurality of streams flowing above and substantially parallel to the upper surface of said static bed of particle-form catalytic material, the improvement which comprises baffling means comprising a circular band concentric with and substantially parallel to the vertical axis of said reactor and horizontally spaced from said vapor inlet distributor, mounted in the paths of at least 58 percent of said plurality of streams flowing above and substantially parallel to said upper surface of said static bed of particle-form solid catalytic material, and constructed and arranged to change the direction of flow of about 40 to 60 percent of the aforesaid at least 58 percent of the parallel flowing vapors.

3. The baffling means claimed in claim 2 wherein the circular band is provided with a plurality of vertical slots.

4. The baffling means claimed in claim 2 wherein the baffling means comprises a plurality of segments of a circle, each segment having substantially the same radius and center.

5. The baffling means claimed in claim 2 wherein the baffling means comprises a plurality of segments having substantially the same radius and disposed in laterally overlapping positions.

6. In a reactor having a static bed of particle-form solid catalytic material, having a vapor inlet distributor substantially concentric with the vertical axis of the reactor and vapor inlet, said vapor inlet distributor comprising a plurality of vertically spaced apart annular plates each having an outer diameter substantially equal to the inner diameter of said vapor inlet and an inner diameter decreasing from the top annular plate to the bottom annular plate, a collar mounted on the inner periphery of each of said annular plates and extending upwardly to at least the plane of the upper surface of the next higher annular plate, and an unperforated disk vertically spaced downwardly from the lowest of said annular plates, said vapor inlet distributor being constructed and arranged to discharge vapors as a plurality of streams flowing above and substantially parallel to the upper surface of said static bed of particle-form solid catalytic material, the improvement which comprises providing said disk with a plurality of vapor passages having a total area about 20 to 40 percent of the total horizontal surface area of said disk and baffling means horizontally spaced from said vapor inlet distributor, mounted in the paths of at least 58 percent of said plurality of streams flowing above and substantially parallel to said upper surface of said static bed of particle-form solid catalytic material and constructed and arranged to change the direction of flow of about 40 to 60 percent of the aforesaid at least 58 percent of the parallel flowing vapors.

7. The improvement set forth in claim 6 wherein said baffling means is a circular band concentric with and substantially parallel to the vertical axis of said reactor.

8. The improvement set forth in claim 6 wherein said baffling means is a circular band concentric with and substantially parallel to the vertical axis of said reactor and horizontally spaced from the outer periphery of said vapor inlet distributor a distance at least four times the distance between the annular plates of said vapor inlet distributor.

9. The improvement set forth in claim 6 wherein said baffling means is a circular band concentric with and substantially parallel to the vertical axis of said reactor, said circular band is horizontally spaced from the outer periphery of said vapor inlet distributor a distance at least four times the distance between the annular plates of said vapor inlet distributor, the upper edge of said circular band is above the plane of the uppermost annular plate having a collar of said vapor inlet distributor and the lower edge of said circular band is below the plane of the annular plate immediately below said uppermost annular plate.

References Cited in the file of this patent

UNITED STATES PATENTS

| | | |
|---|---|---|
| 2,068,094 | Webre | Jan. 19, 1937 |
| 2,494,067 | Snowden | Jan. 10, 1950 |
| 2,884,372 | Bergstrom | Apr. 28, 1959 |

FOREIGN PATENTS

| | | |
|---|---|---|
| 794,090 | Great Britain | Apr. 30, 1958 |